Aug. 26, 1941.   L. LOEWENSTEIN   2,253,909
ART OF MANUFACTURING FROZEN CONFECTIONS
Filed Oct. 22, 1938   4 Sheets-Sheet 2
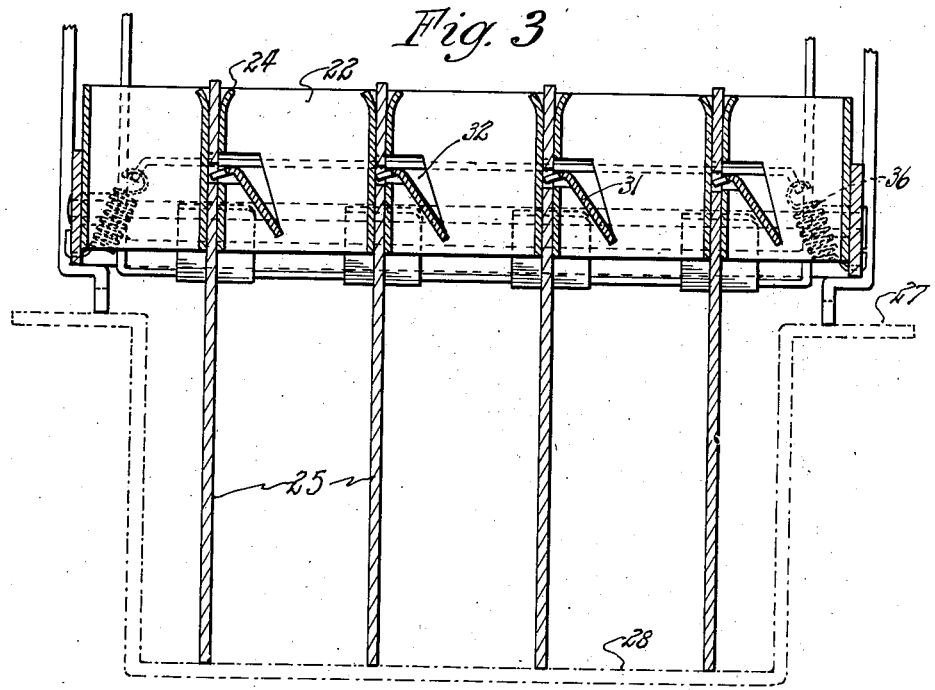
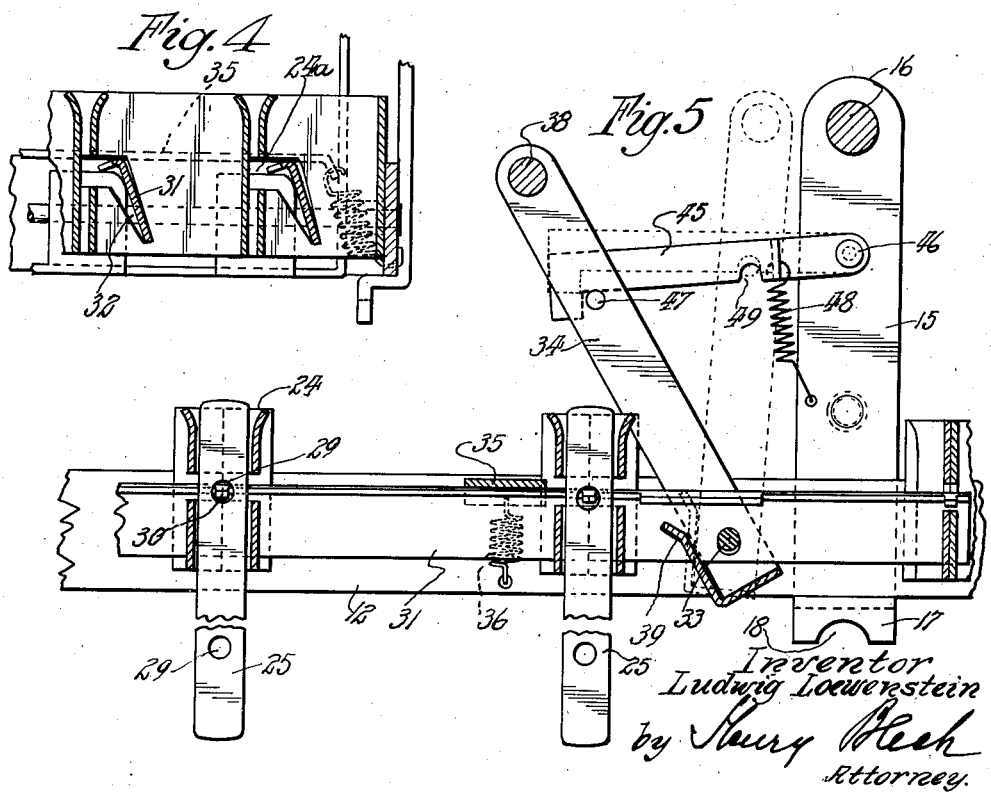
Inventor
Ludwig Loewenstein
by Henry Hech
Attorney.

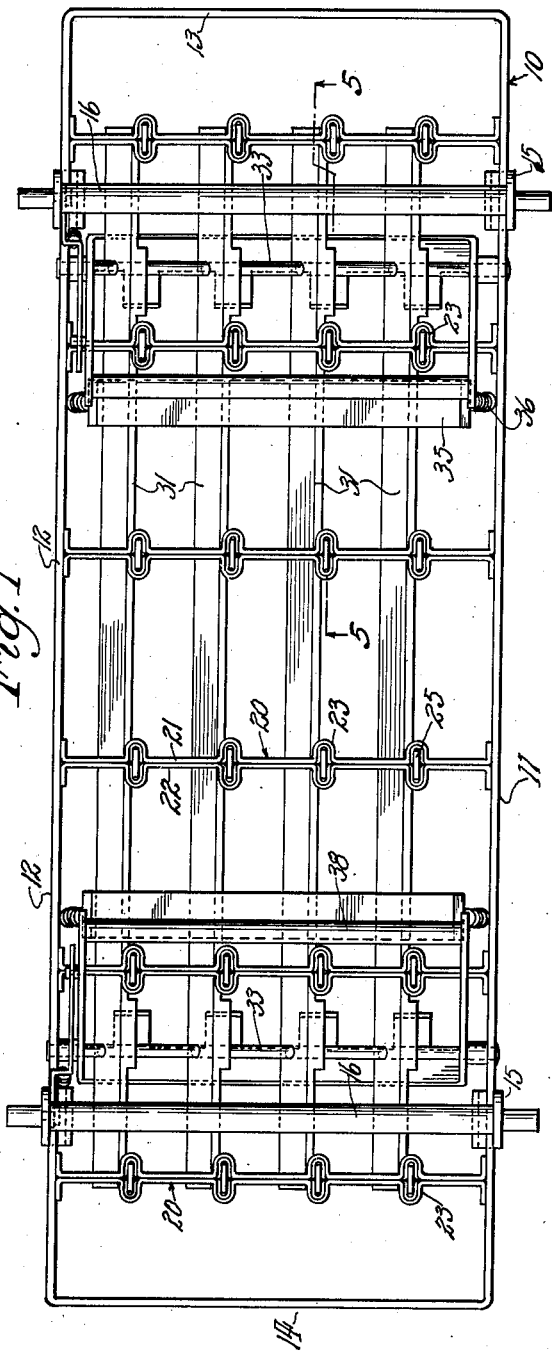

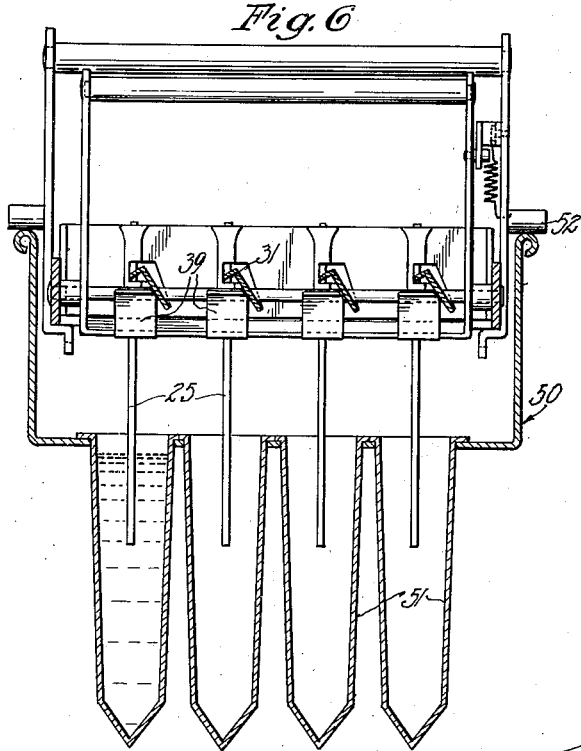
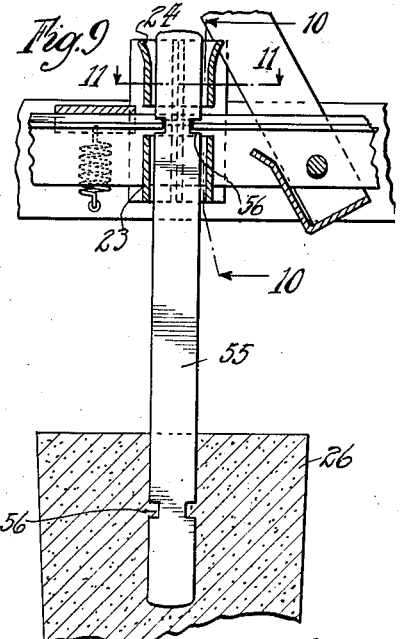
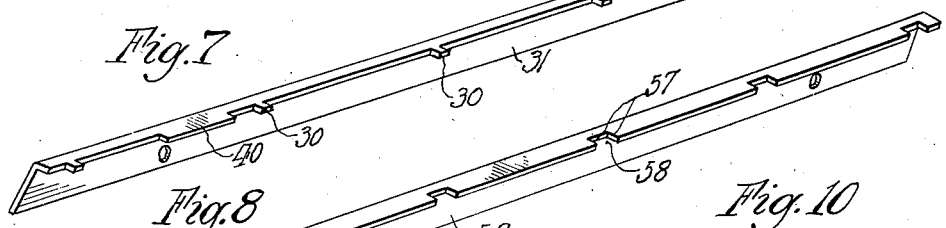
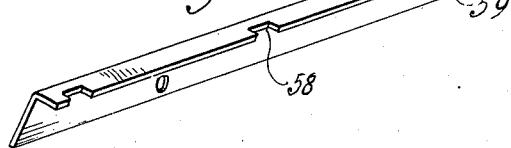
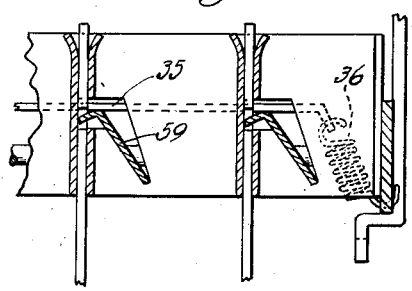
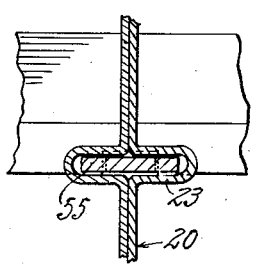

Aug. 26, 1941.  L. LOEWENSTEIN  2,253,909
ART OF MANUFACTURING FROZEN CONFECTIONS
Filed Oct. 22, 1938  4 Sheets-Sheet 4

Inventor
Ludwig Loewenstein
by Henry Blesh
Attorney.

Patented Aug. 26, 1941

2,253,909

UNITED STATES PATENT OFFICE 2,253,909

ART OF MANUFACTURING FROZEN CONFECTIONS

Ludwig Loewenstein, Chicago, Ill., assignor to Frigie Corporation of America, Chicago, Ill., a corporation of Illinois Application October 22, 1938, Serial No. 236,408

7 Claims. (Cl. 294—87)

The invention relates to the art of manufacturing frozen confections and, more particularly, to a gripper frame in which a plurality of sticks are retained in fixed position and in co-operative relation to mold cavities in which the confection congeals and adheres on the stick, so that the gripper frame may be lifted with the confections adhering to the lower ends of the sticks.

It is an object of the invention to provide a stick handling apparatus wherein the sticks are held in fixed position by pivotally secured means adapted to enter with pins in apertures in the sticks and releasing the sticks when expedient.

It is an object to provide means for conveniently actuating the holding means for the pins.

It is a further object to provide resilient means for locking the pin holding means in functional position.

Another object aims at providing means for locking the pin holding means in idle position.

Another object aims at providing a new mechanical movement in effecting oscillation or tilting.

A still further object constitutes the provision of certain features of construction and arrangement tending to enhance the reliability and efficiency of a device of the character specified.

With these foregoing and many other important objects in view, the invention comprises the means described in the following specification, particularly pointed out in the claims forming a part thereof, and illustrated in the accompanying drawings, in which:

Fig. 1 is a plan view of my invention.

Fig. 2 is a side elevation, illustrating the device inserted in a mold, diagrammatically indicated in dotted lines.

Fig. 3 is an enlarged section taken on lines 3—3 of Fig. 2.

Fig. 4 is a fragmentary section, similar to Fig. 3, with the parts in different position.

Fig. 5 is an enlarged section taken on line 5—5 of Fig. 1.

Fig. 6 is a section on line 6—6 of Fig. 2.

Fig. 7 is a perspective view of the stick securing means.

Fig. 8 is a similar perspective view of a variant form.

Fig. 9 is a fragmentary view of the variant form, showing the application of the securing means of Fig. 8.

Fig. 10 is a section taken on line 10—10 of Fig. 9.

Fig. 11 is a cross section taken on line 11—11 of Fig. 9.

Figure 12:
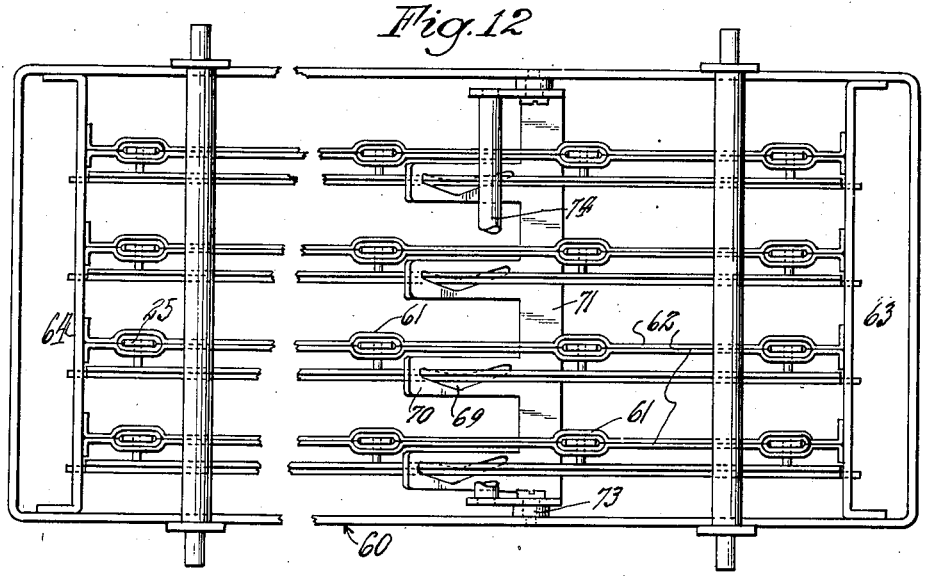
Fig. 12 is a plan view of parts broken away of a further variation.
Figures 13, 14:
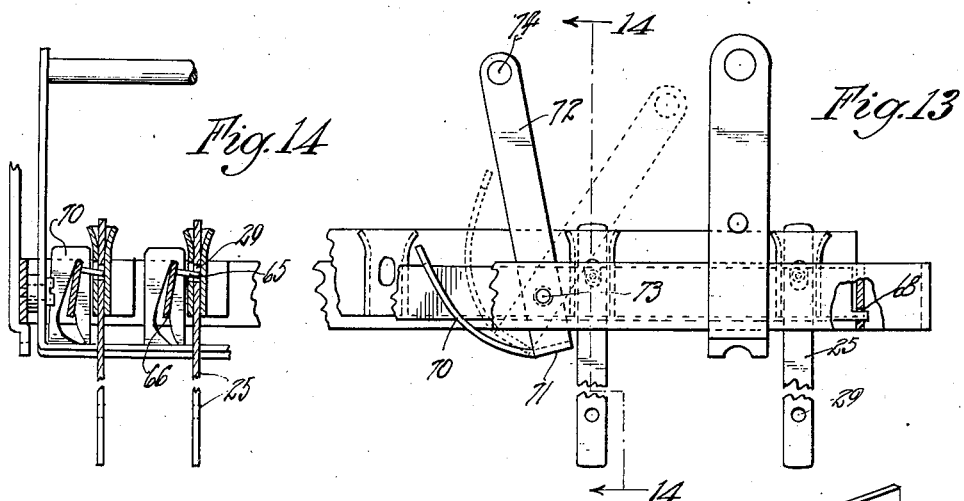
Fig. 13 is a partial side elevation of the structure of Fig. 12.
Fig. 14 is a section taken on line 14—14 of Fig. 13.
Figures 15, 16:
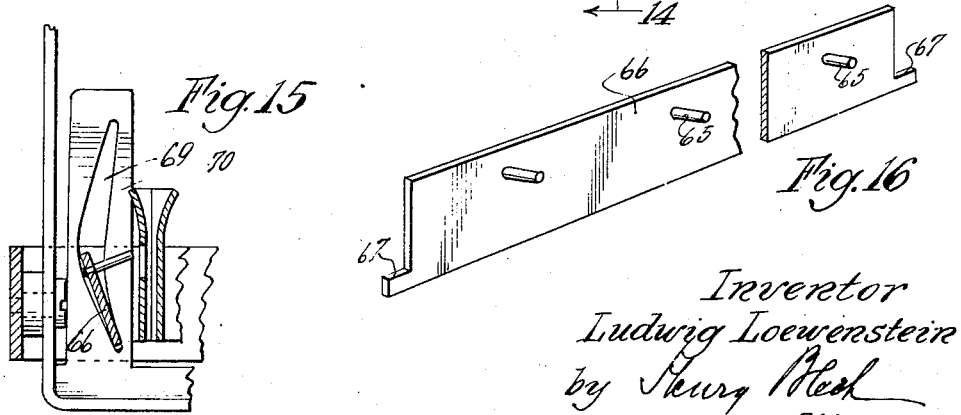
Fig. 15 is an enlarged view similar to Fig. 14, with parts in different position.
Fig. 16 is a perspective view of the stick securing means.

Referring to the drawings, 10 indicates the main frame which herein is shown as rectangular, and includes side members 11 and 12 and cross members 13 and 14.

Secured to the main frame, for example by welding, are the handle supports 15 which carry, at the upper end, the handle proper 16.

The brackets 15 are formed with a downwardly projecting lug 17 (Fig. 5), which is formed, at the lower end, with a semi-circular recess 18, adapted to rest on the handle bars 16 when the frames are stacked upon each other, as indicated in Fig. 2.

Secured to the side members 11 and 12 of the main frame are cross-members 20, which are composed of two similar bars 21 and 22. They are formed with outwardly bent portions to provide a plurality of tubes or sleeves 23 which, at the upper end, are outwardly flared, as at 24, to permit insertion of sticks 25, to which are congealed frozen confections, diagrammatically indicated as at 26. The tubes are provided with a slot 24a for a purpose hereinafter explained.

In practice, the carrier-frame 10 is supported upon any suitable platform 27, diagrammatically indicated in Fig. 3, which has a pan 28, which serves as a gauge for sticks 25, so that when they are inserted into the tubes 23, they drop onto the pan 28 to be in proper alignment.

The sticks or holders 25 are formed with apertures 29, preferably one at either end and, when properly aligned, as illustrated in Fig. 3, the uppermost apertures 29 may be penetrated by lugs or pins 30 of the securing bars 31, which lugs project through the slots 24a of the tubes 23.

The securing bars 31 are carried in slots 32, formed in cross-members 21 and 22, respectively, and are held in alignment by shafts 33, which also carry the actuating levers 34 for locking members 31. Said locking means are normally held in locking position by a pair of clamping bars 35, which are downwardly thrust by a plurality of springs 36, one end of which is secured to the bars 35 and the other end to the side members 11 and 12 of the main frame.

In order to release the securing bars 31 and withdraw the pins 30 from the apertures 29 of the sticks 25, the operator engages the handle bars 38 of the levers 34 and pulls them into the dotted line position of Fig. 5, whereupon the cam portion 39, moving in an arc, engages the inclined face of the securing member 31 and rotates said securing bars to the position of Fig. 4 against the compression of the springs 36 of the pressure bars 35.

In this position, the cam members 39 preferably are in engagement with the projecting flanges 40 of the securing member 31.

Sticks 25, to which the confections 26 are congealed, may then drop, by gravity, from the slots of the pockets 23.

In order to lock the levers 34 and to hold the securing means 31 in unlocked position, I have provided latch members 45, which are pivotally connected, as at 46, to one of the brackets 15, and are held in engagement with a pin 47 on the levers 34 by a spring member 48.

In the locked position, the pin 47 engages a cut out 49 in the latch members 45 and they are held in inoperative position until the operator lifts the latch members 45, whereupon the levers 34 return to the full position of Fig. 5.

Referring to Figs. 2 and 6, I have illustrated the frames inserted in the mold 50, which includes a plurality of cavities 51, into which the sticks 25 project. The frame is gauged in proper alignment by gauge pins 52, secured to the brackets 15.

Referring to Figs. 8 to 11, I have illustrated a locking means for a different shaped stick 55. The stick 55 is provided, at both ends, with slots 56, 56, adapted to be engaged by the edges 57, 57 of notches 58, formed in the locking member 59.

As will be seen from Fig. 9, the sticks 55 are those held in locked position within guides or pockets 23. Means for actuating the locking bar 59 and other details are identical to the device previously described.

Referring to Figs. 12 to 16, a frame 60 is shaped similar to the frame 10. However, the pockets 61, formed in the longitudinal members 62, are supported, for example by welding, to reinforcing members 63, 64.

Positioned in the pockets 61 are sticks 25, provided with apertures 29, the uppermost of which are penetrated by pins 65, projecting from the locking member 66. It may be understood that a locking pin 65, for each of the pockets 61 is provided. The locking member is pivoted to the reinforcing members 63 and 64 by means of lugs 67, which enter apertures 68 in said reinforcing bars.

Each one of the locking bars is positioned within a cam slot 69 of fingers 70, which may be integral with a cross bar 71 which, at either end, is provided with a lever or arm 72.

The arms are pivoted, as at 73, to the frame 60 and, at the other uppermost end, carry a handle 74. Note that the fingers 70 are curved to permit tilting of the locking members 66 from the locking position of Fig. 14 to the unlocking position of Fig. 15.

The slots 69 are shaped and proportioned to cause such movement. In other words, rotation of the levers 72 from the full position of Fig. 13 to the dotted line position, moves the fingers 70 so that the slots 69 gradually tilt the locking members 66 and the friction, caused by a slight flexure of the members 66, locks the fingers 70 and handles 72 in either position.

Under ordinary conditions, only one of those actuating members, as illustrated in Fig. 12, is used, but more may be employed.

While the drawings show preferred embodiments of the invention, numerous changes and alterations may be made without departing from the spirit of the invention.

I, therefore, do not limit myself to the details of construction and arrangement, as shown, but claim my invention as broadly as the state of the art permits.

I claim:

1. A device of the character described, including a frame, a plurality of sleeves supported in spaced relation in said frame and adapted to receive individual sticks, a single tiltably supported means for engaging or releasing the sticks, and means pivoting about an axis at right angles to the pivotal axis of said first named means for actuating the latter.

2. A device of the character described, including a frame, a guide tube mounted in said frame and adapted to receive a stick therethrough, tiltably mounted means for engaging the stick or releasing the same, and means pivoting about an axis at right angles to the pivotal axis of said first named means for actuating the latter.

3. A device of the character described, including a frame, a guide tube having an opening mounted in said frame and adapted to receive a stick therethrough, tiltably mounted means for engaging the stick through said tube opening or releasing the same, and means pivoting about an axis at right angles to the pivotal axis of said first named means for actuating the latter.

4. A device of the character described, including a frame, a plurality of guide tubes in said frame and adapted to receive individual sticks, a bar tiltably mounted in said frame and provided with pins for entering apertures in the sticks to retain the same, and means pivoting about an axis at right angles to the pivotal axis of said bar for actuating the latter.

5. A device of the character described, including a frame, a plurality of guide tubes in said frame and adapted to receive individual sticks, said tubes being provided with an aperture, a bar tiltably mounted in said frame and provided with pins for projecting through said tube apertures into apertures provided in the sticks, and lever operated means pivoting about an axis at right angles to the pivotal axis of said bar for actuating the latter.

6. A device of the character described, including a frame, a plurality of guide tubes in said frame and adapted to receive individual sticks, said tubes being provided with an aperture, a bar tiltably mounted in said frame and provided with pins for projecting through said tube aperture into apertures provided in the sticks, and a lever having a cam face mounted in said frame pivoting about an axis at right angles to the pivotal axis of said bar for actuating the latter.

7. A device of the character described, including a frame, a plurality of sleeves supported in spaced relation in said frame and adapted to receive individual sticks, a single tiltably supported means for pendently engaging or releasing the sticks, and means for actuating said first named means said actuating means tilting about an axis at right angles to the tilting axis of said first named means.

LUDWIG LOEWENSTEIN.